(12) United States Patent
Lobert et al.

(10) Patent No.: US 6,408,969 B1
(45) Date of Patent: Jun. 25, 2002

(54) ROAD ROLLER

(75) Inventors: Horst Lobert, Aschersleben; Jorg Kehler, Gatersleben, both of (DE)

(73) Assignee: Vibromax Bodenverdichtungsmaschinen GmbH, Gatersleben (DE)

( * ) Notice: Subject to any disclaimer, the term of this patent is extended or adjusted under 35 U.S.C. 154(b) by 0 days.

(21) Appl. No.: 09/647,106

(22) PCT Filed: Mar. 26, 1999

(86) PCT No.: PCT/EP99/02350
§ 371 (c)(1),
(2), (4) Date: Sep. 22, 2000

(87) PCT Pub. No.: WO99/48716
PCT Pub. Date: Sep. 30, 1999

(30) Foreign Application Priority Data

Mar. 26, 1998 (DE) .................................... 298 05 539 U

(51) Int. Cl.$^7$ .............................................. B60K 11/00
(52) U.S. Cl. ...................... 180/68.1; 180/68.6; 165/41
(58) Field of Search ............................. 180/68.1, 68.2, 180/68.3, 68.4, 68.6; 165/41, 51

(56) References Cited

U.S. PATENT DOCUMENTS

| | | | |
|---|---|---|---|
| 3,970,161 A | | 7/1976 | Rowe et al. |
| 4,226,217 A | * | 10/1980 | Haslbeck et al. ........ 123/41.62 |
| 4,382,481 A | * | 5/1983 | Moore ....................... 180/68.1 |
| 4,606,422 A | | 8/1986 | Jewett |
| 4,696,361 A | * | 9/1987 | Clark et al. ................ 180/68.4 |
| 4,815,550 A | * | 3/1989 | Mather et al. ............ 180/68.1 |
| 4,934,449 A | * | 6/1990 | Watt et al. ..................... 165/41 |
| 5,042,602 A | * | 8/1991 | Nakatani et al. .......... 180/68.3 |
| 5,692,467 A | | 12/1997 | Sahm et al. |
| 6,257,359 B1 | * | 7/2001 | Granlund et al. .......... 180/68.1 |

* cited by examiner

*Primary Examiner*—Michael Mar
(74) *Attorney, Agent, or Firm*—Stephen B. Salai, Esq.; Brian B. Shaw, Esq.; Harter, Secrest & Emery LLP

(57) ABSTRACT

The invention relates to a road roller (10) comprising a chassis frame (22), an encapsulated engine (15) and a radiator (34) through which cooling air flows. For a supply of fresh cooling air free of dust a hood (16) covering the engine (15) and a separate housing (17) accommodating the radiator (34) are provided. The hood (16) comprises an air intake (24) as well as air outlet openings (35) and is air communicatingly connected to the housing (17).

10 Claims, 3 Drawing Sheets

ROAD ROLLER

The present invention relates to a road roller comprising a chassis frame, an encapsulated engine and a radiator through which cooling air flows.

Such road rollers are known, they being put to use more particularly on road construction sites. The radiator serves to cool the engine as well as a hydraulic system usually installed. In known road rollers the cooling air is drawn in from the side, from the front and/or from underneath, guided through the radiator and finally exhausted. For circulating the air a fan is normally employed which is fitted to the radiator.

It is often the case on known road rollers that the cooling air drawn into the system is dirty and dust-laden, the probability of this especially on construction sites being relatively high. The dust contained in the cooling air forms deposits in the engine compartment and radiator, resulting in the engine compartment being unecessarily soiled whilst simultaneously detrimenting the cooling effect of the radiator. In addition, difficulties may be experienced in servicing the hydraulic assemblies, due to this soilage, since contamination of the hydraulic fluid with dust needs to be avoided.

The present invention has thus the object of providing a supply of fresh air for cooling free of dust on such a road roller.

In accordance with the invention this object is achieved in a road roller of the aforementioned kind in that for guiding the cooling air a hood covering the engine incorporating an air intake and air outlet openings and a separate housing accommodating the radiator are provided, the hood and the housing being air-communicatingly connected.

Guiding the air in this way permits defined intake and exhaust of the cooling air. The cooling air is drawn in through the air intake of the hood only from above, i.e. from the substantially dust-free air above the road roller with no intake from underneath or from the side. The cooling air is then directed through the housing past the radiator back into the hood and exhausted through the air outlet openings of the hood, preferably in the direction of underside of the road roller, i.e. remote from the air intake to thus avoid a recirculation of the cooling air.

It is this air guiding system in accordance with the invention which considerably reduces soilage of the engine compartment and radiator, the cooling effect of which now remains substantially unchanged over lengthy periods. At the same time servicing the hydraulic assemblies is facilitated since the engine compartment remains substantially free of dust.

Advantageous further embodiments and aspects of the invention read from the sub-claims.

Preferably the hood comprises a fitting with an air intake in an air-flow connection via an opening with the housing accommodating the radiator. The fitting is closed off air-tight relative to the engine compartment covered by the hood. It is this design that ensures that the cooling air drawn into the system is not guided undirected through the hood, but instead from the fitting of the hood into the housing and subsequently to the radiator so that the complete air mass flow drawn into the system is thus made use of for cooling.

The hood comprises preferably an intake opening for the cooling air which is assigned an exhaust opening in the housing. The cooling air is drawn in from the environment into the fitting on the hood. From the fitting the cooling air gains access through an opening to the housing where it is deflected to flow through the radiator, before then passing through the exhaust opening of the housing and the intake opening back into the hood. The cooling air is thus drawn in, directed through and exhausted from the system all by defined porting.

In one advantageous aspect sidewalls are provided on the chassis frame beneath the hood for guiding the cooling air, the height of these sidewalls being less than that of the hood. Downstream of the radiator the cooling air flow is parted by the sidewalls within the hood. Part of the cooling air is immediately exhausted whilst another part continues to be guided between the sidewalls before being later exhausted. The cooling air gains access through the interspace between sidewalls and hood to the air outlet openings. It is this design that enhances the cooling effect. At the same time the encapsulation of the engine by the hood, housing and sidewalls achieves a reduction in the noise level.

Advantageously the hood comprises sideplates ported for cooling air exit, these ports providing defined air outlet openings for the cooling air. Any undesirable circulation of the cooling air, remaining in the engine compartment or exit at an undesirable location, especially in the vicinity of the air intake is reliably prevented.

Preferably the sidewalls are arranged spaced away from the sideplates and cover the outlet openings of the sideplates. The engine is encapsulated by the sidewalls to thus achieve a reduction in the noise level. The sidewalls also protect the engine from any dirt and dust entering the ports.

In another advantageous aspect the sidewalls extend from the radiator up to the end of the hood, as a result of which the complete engine compartment is laterally encapsulated by the sidewalls to further enhance a reduction in the noise level. At the same time any ingress of swirling dust-laden air into the engine compartment is again at least made difficult by the sidewalls.

Preferably the height of the sidewalls diminishes as of the radiator, they being configured roughly trapezoidal and laterally cover the ports in the sideplates of the hood to thus reliably protect the engine compartment from soilage. Diminishing the height of the sidewalls permits gaining access to the engine, when the hood is hinged up out of the way to faciliate maintenance work.

Advantageously the air intake comprises slots machined in the fitting of the hood which are speedy and cost-effective to produce. As an alternative a grille may be made use of.

In accordance with yet another further embodiment of the invention the hood is swivel-mounted on a chassis frame of the road roller. The housing accommodating the radiator is rigidly secured to this chassis frame. For maintenance work the hood may be hinged out of the way so that good access to the engine, radiator and hydraulic assemblies is assured. On completion of the maintenance work the hood is reclosed, the air guidance system in accordance with the invention then being instantly ready for operation without any further manipulation.

The invention will now be detained by way of an example embodiment illustrated schematically in the drawing in which.

Figure 1:
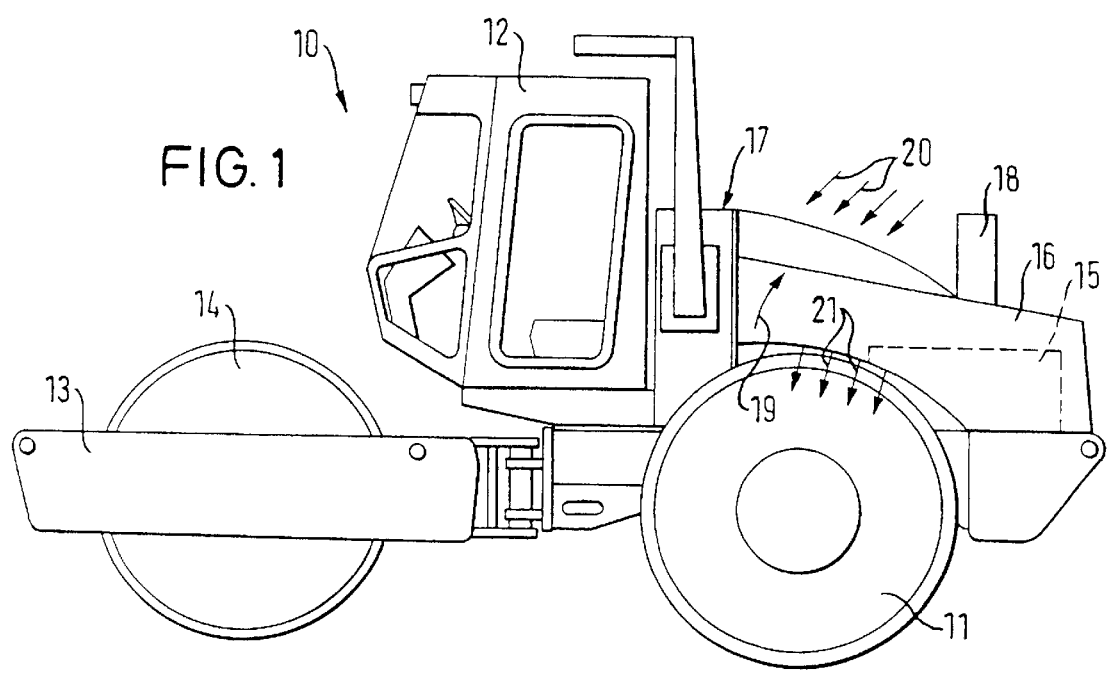
FIG. 1 is a side view of a road roller incorporating the air guidance system in accordance with the invention.

Referring now to FIG. 1 there is illustrated a road roller 10 including two driven wheels 11 as well as a cab 12. The road roller 10 comprises an outrigger 13 to which a roller 14 is rotatively secured. For the drive an engine 15 is provided which is covered by a hood 16. Arranged between the hood 16 and the cab 12 is a housing 17. The hood 16 comprises a shell 18 surrounding an exhaust (not shown) of the engine 15, and Hood 16 can be hinged open in the direction of the arrow 19 and closed in the opposite direction to thus faciliate servicing the engine 15.

The cooling air is drawn into the system from above in the direction of the arrows 20 and exhausted downwards in the region of the wheels 11 in the direction of the arrows. 21. Air intake is thus in a substantially dust-free region whilst air exhaust is in a dust-laden region remote from the intake.

Figure 2:
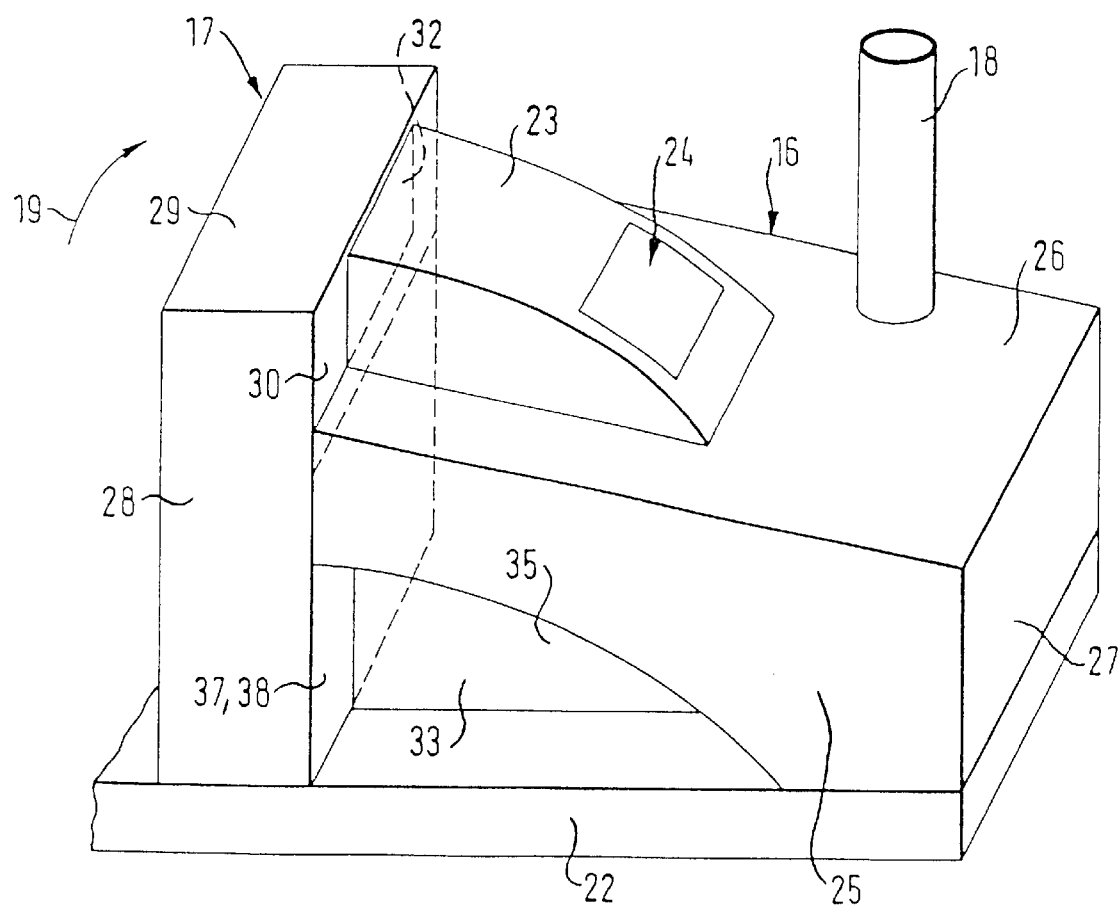
FIG. 2 is a schematic view in principle of the air guidance system in accordance with the invention.

Referring now to FIG. 2 there is illustrated in principle the hood 16 as well as the housing 17 together with a chassis frame 22 of the road roller 10. The hood 16 is mounted hinged to the chassis frame 22 in the direction of the arrow 19 whilst the housing 17 is secured immovably to the chassis frame 22. The hood 16 is provided with a fitting 23 incorporating an air intake 24, the hood 16 comprising sideplates 25, a cover plate 26 as well as an end plate 27. The sideplates 25 are provided with ports 35 for exit of the cooling air.

The housing 17 comprises two sideplates 28 as well as a cover plate 29 and is provided in the direction of the hood 16 with a front plate 30. This front plate 30 comprises an opening 32 which is sized to adapt to the fitting 23 of the hood 16. The front plate 30 does not extend over the full height of the housing 17, it instead ending just below the cover plate 26 of the hood 16. The housing 17 comprises below the front plate 30 an outlet port 38 which is aligned with an intake port 37 of the hood 16.

Figure 3:
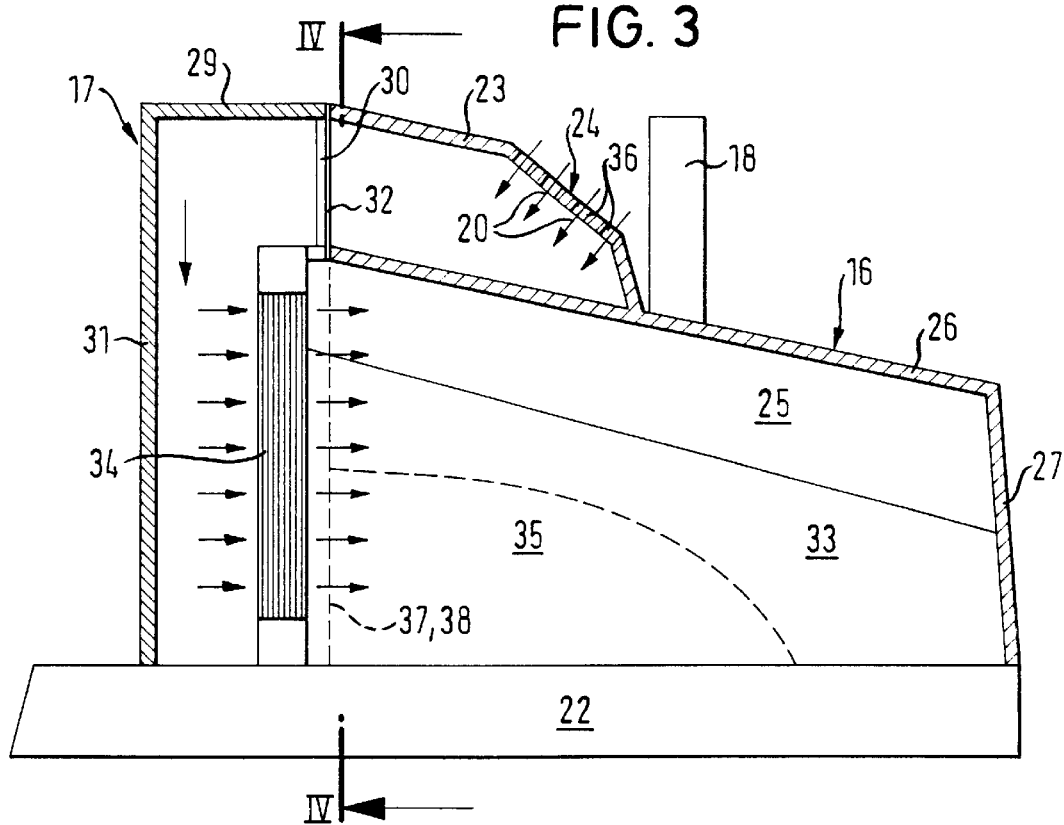
FIG. 3 is a longitudinal section through the air guidance system in accordance with the invention.

Referring now to FIG. 3 there is illustrated how in the direction of the cab 12 the housing 17 is closed off by a backplate 31. Accommodated in the housing 17 is a radiator 34.

Fitted below the hood 16 on the chassis frame 22 are two sidewalls 33 spaced away from the sideplates 25. These sidewalls 33 are configured such that they cover the ports 35 in the sideplates 25 of the hood 16. The engine 15 is encapsulated by the sidewalls 33 and the hood 16 and is thus protected from soilage. At the same time this reduces the noise level.

Figure 4:
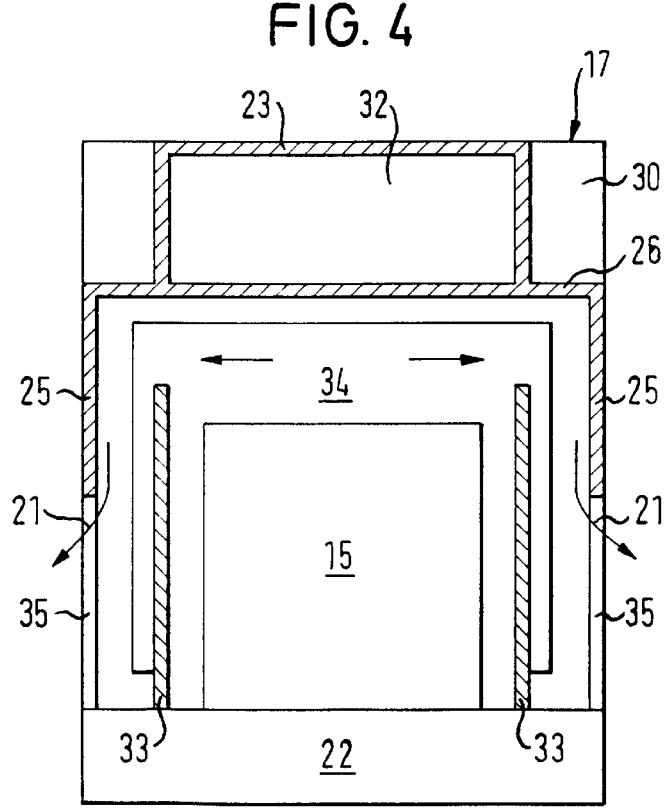
FIG. 4 is a section taken along the line IV—IV as shown in FIG. 3.

Referring now to FIGS. 3 and 4 further design details and the functioning of the air guidance system will now be detailled.

The radiator 34 extends roughly up to the level of the hood 16. The sidewalls 33 run from the radiator 34 up to the end of the hood 16, they thereby having a diminishing height and are configured so that they cover the ports 35 in the sideplates 25 of the hood 16.

At the same time a communicating passage for the cooling air is created between the upper edge of the sidewalls 33 and the cover plate 26 of the hood 16.

As an alternative the sidewalls 33 may be configured somewhat shorter so that they cover roughly two-thirds of the spacing of the radiator 34 from the end of the hood 16. In this configuration the ports 35 in the sideplates 25 of the hood 16 are still covered by the sidewalls 33.

The fitting 23 is open at its end facing the housing 17. The opening 32 in the front plate 30 of the housing 17 is sized to adapt to the fitting 23 so that the housing 17 and the fitting 23 are connected circulating the air and substantially air-tight. On one side of the fitting 23 the housing 17 is closed off by the front plate 30. The fitting 23 is closed off air-tight relative to the engine compartment and comprises an air intake 24 of several slots 36.

The cooling air is drawn into the system through the slots 36 in the direction of the arrows 20 by a fan blading not shown secured to the radiator 34, it flowing through the fitting 23 of the hood 16 and entering through the opening 32 into the housing 17. Here, it is deflected by the backplate 31 to flow through the radiator 34 and to reenter the hood 16 through the outlet port 38 and the intake port 37. After this, part of the cooling air is exhausted immediately in the direction of the arrow 21 through the ports 35 in the sideplates 25 of the hood 16. Another part flows along the engine 15 to produce additional cooling. This portion of the cooling air gains access through the interspace between the upper edge of the sidewalls 33 and the hood 16 to the ports 35 and is likewise exhausted in the direction of the arrow 21.

Referring now to FIG. 4 there is illustrated the hood 16 and the housing 17 the same in width to thus achieve a pleasing appearance overall. At the same time the space available between the wheels 10 is made full use of, the radiator 34 in this arrangement extending over the full width of the housing 17 so that a large cooling surface area is made available.

The invention ensures on road rollers the intake of clean, fresh cooling air free of dust. Soilage of the engine compartment is reduced and servicing the hydraulic assemblies faciliated. At the same time the encapsulation of the engine results in a reduction in the noise level.

What is claimed is:

1. A road roller comprising:

a chassis frame;

an encapsulated engine;

wheels driven by said engine;

a radiator through which cooling air flows;

a hood being air communicatingly connected with said radiator and covering said engine and guiding said cooling air; and a housing separated from said hood and accommodating said radiator;

wherein said hood comprises a fitting having an air intake for drawing in said cooling air from above, said fitting being closed off air-tight relative to an engine compartment of said hood and in an air-flow connection with said housing;

wherein said housing has a backplate which deflects said cooling air flowing through said fitting and entering said housing to flow through said radiator and to enter said engine compartment of said hood; and wherein said hood further comprises sideplates which are provided with an air outlet for exit of said cooling air entering said hood downwards in the region of said wheels.

2. The road roller as set forth in claim 1, in which said fitting is open at an end thereof facing said housing, wherein said housing comprises a front plate, which has an opening sized to adapt to said fitting so that said housing and said fitting are connected circulating said cooling air and substantially air-tight.

3. The road roller as set forth in claim 2, in which said housing comprises below said front plate an outlet port aligned with an intake port of said hood to enable said cooling air to enter said hood.

4. The road roller as set forth in claim 1, in which said chassis frame is provided with sidewalls beneath said hood guiding said cooling air, said sidewalls being arranged spaced away from said sideplates of said hood and having a height which is less than that of said sideplates of said hood, wherein said engine is encapsulated by said sidewalls and said hood.

5. The road roller as set forth in claim 4, in which said sideplates are provided with ports defining said air outlet.

6. The road roller as set forth in claim 5, in which said sidewalls cover said ports in said sideplates.

7. The road roller as set forth in claim 4, in which said sidewalls extend from said radiator up to the end of said hood.

8. The road roller as set forth in claim 4, in which the height of said sidewalls diminishes as of said radiator.

9. The road roller as set forth in claim 1, in which said fitting comprises several slots defining said air intake.

10. The road roller as set forth in claim 1, in which said hood is swivel-mounted on said chassis frame.

* * * * *

UNITED STATES PATENT AND TRADEMARK OFFICE
CERTIFICATE OF CORRECTION

PATENT NO.   : 6,408,969 B1                                          Page 1 of 1
DATED        : June 25, 2002
INVENTOR(S)  : Horst Lobert and Jorg Kehler It is certified that error appears in the above-identified patent and that said Letters Patent is hereby corrected as shown below:

<u>Title page,</u>
Item [30], the correct priority data should read -- 289 05 539.2 --

Signed and Sealed this

Eighteenth Day of February, 2003

JAMES E. ROGAN
*Director of the United States Patent and Trademark Office*